Figure 2:
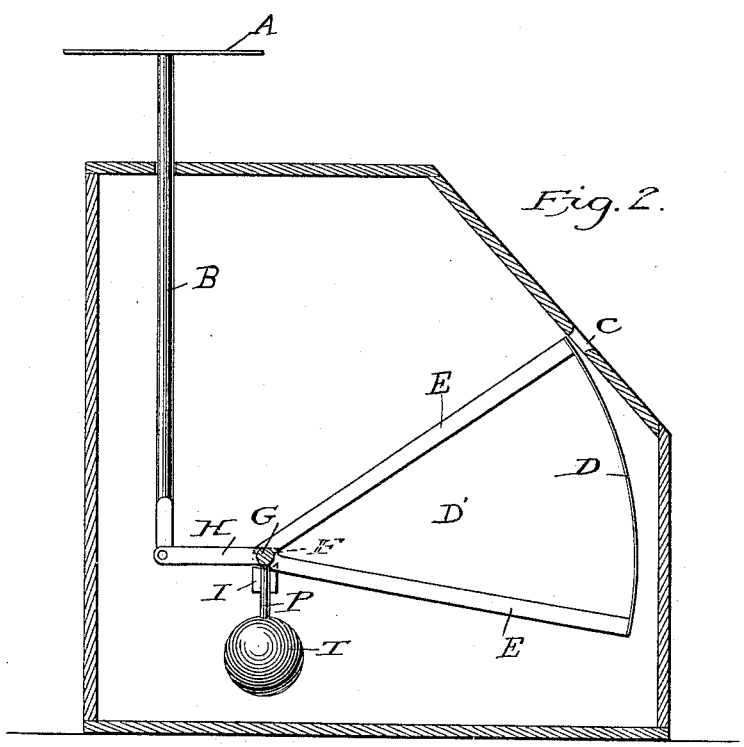

(No Model.) 2 Sheets—Sheet 1.
I. S. McGIEHAN.
POSTAL SCALE.
No. 518,725. Patented Apr. 24, 1894.
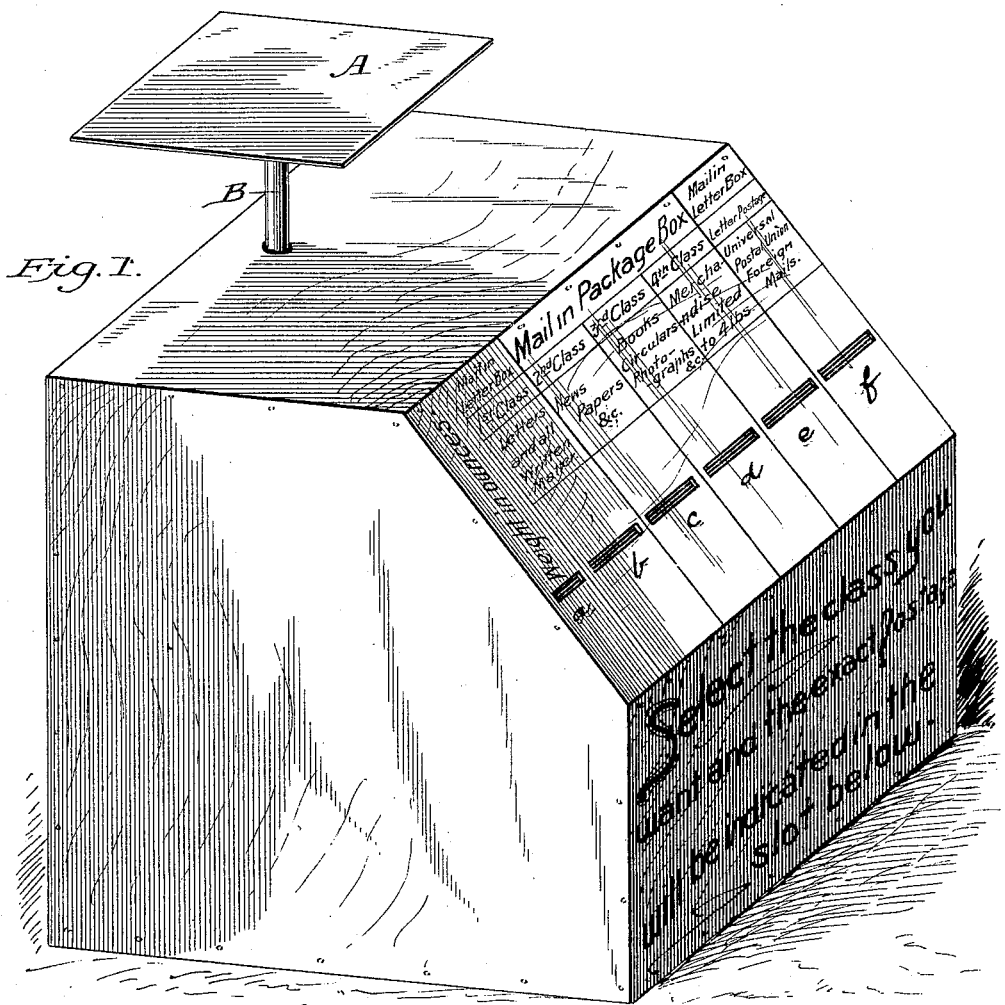
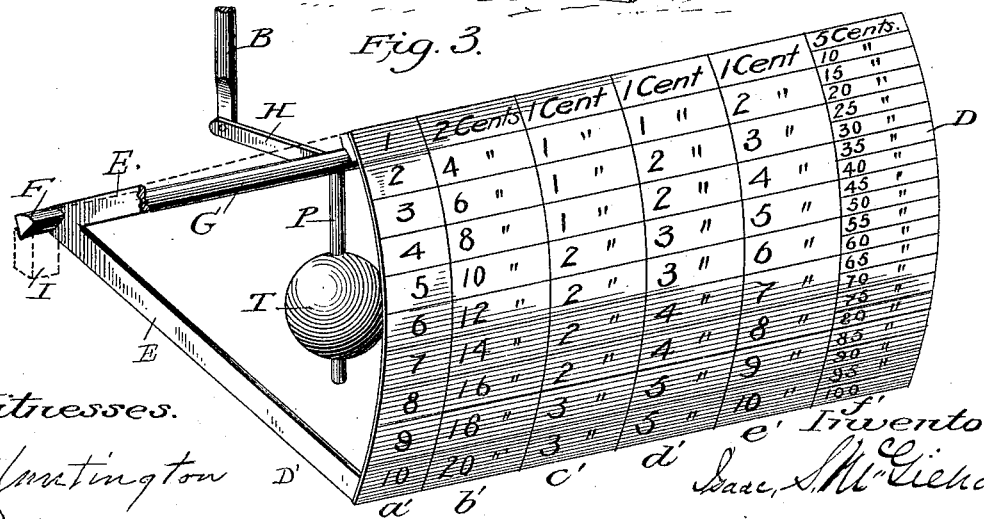
Witnesses.
F. H. Huntington
R. S. Spencer
Inventor.
Isaac S. McGiehan (No Model.)

2 Sheets—Sheet 2.

I. S. McGIEHAN.
POSTAL SCALE.

No. 518,725. Patented Apr. 24, 1894.

Witnesses.
G. N. Huntington
R. S. Spencer

Inventor.
Isaac S. McGiehan

UNITED STATES PATENT OFFICE.

ISAAC S. McGIEHAN, OF NEW YORK, N. Y.

POSTAL SCALE.

SPECIFICATION forming part of Letters Patent No. 518,725, dated April 24, 1894.

Application filed August 11, 1893. Serial No. 482,947. (No model.)

*To all whom it may concern:*

Be it known that I, ISAAC S. MCGIEHAN, of the city, county, and State of New York, have invented a new and useful Improvement in Postal Scales, of which the following is a specification.

This invention relates to scales for weighing postal matter, such as letters, newspapers, books, &c.

It has for its object to provide a scale that will indicate the amount of weight of the package and at the same time show the class of mail to which it belongs and the amount of postage necessary to apply, also the proper box in which to mail the package, as will be hereinafter more fully described.

In the accompanying drawings, which form a part of this specification, my invention is fully illustrated in three separate figures, with similar letters of reference to indicate corresponding parts, as follows:

Figure 1 represents a perspective view of my improved scales, showing the slots $a, b, c, d, e$ and $f$, and the formation of the printed information above each slot to show to what class the package being weighed belongs and in which of the slots the correct postage may be indicated. Fig. 2 represents a vertical section, showing the internal mechanism which operates the indicator face piece "D," and Fig. 3 represents a perspective view of the indicator "D′," showing the indicated postage on its face, which by the vertical movement of the indicator "D′" is exposed to view through the slots $a, b, c$, &c., as will be hereinafter explained.

The operating mechanism which produces the vertical movement of the indicator face "D" by the weight applied to the weighing platform "A," (Fig. 1) consists simply of the diverging arms E to which the face piece "D" is secured and the upright spindle "B" resting upon the rearwardly projecting arm "H;" the cross bar "G" carrying the counterweight "T" rests with its balance points "F" upon the cleats "I" (Fig. 2) secured to the inside of the case.

It must be understood that there are four of the diverging arms E, one for each corner of the indicator face piece "D," and that the balance bar "G" extends across the rear ends of the arms and the same is secured thereto, leaving sufficient of the balance bar "G" extending beyond the arms to form the balance knife points "F," one of which is shown in Fig. 3. In the center of the balance bar "G" extending rearwardly is the fulcrum arm "H" upon the end of which rests the upright spindle "B." Extending downward from the balance bar "G" is an arm "P" which carries the counterweight "T."

To the inside of the box portion, as shown at "I," Fig. 2, and by the dotted lines in Fig. 3, are secured cleats with sockets in the top, in which the balance points "F" of the bar "G" rest.

To the top of the upright spindle "B" a weighing platform as "A" is secured, thus when the combined weight of the platform "A," spindle "B," and rearwardly extending arm "H" is made to counterbalance the face piece "D" and the diverging arms E, a perfect balance of the mechanism will be had on the balance points "F" by means of the counterweight "T," so that should one ounce be placed on the platform "A" it would cause the face piece "D" to travel upward a space which will be equal to the ounce in weight applied.

The face piece "D" is provided on its face side with a series of transverse lines, the distance between each of them being equal to the vertical movement of the face piece "D" with each ounce applied to the platform "A." Across the transverse lines and vertically across the face piece "D" are lines which divide the face into the spaces $a', b', c', d', e'$ and $f'$, to correspond to the slots $a, b, c, d, e$ and $f$ in the front of the box (Fig. 1). In the first space $a'$ are the numbers 1, 2, 3, &c., which are exposed through the space $a$, Figs. 1 and 2, in routine as the face piece rises, and indicate the ounces of weight resting on the platform "A." In the space $b'$ are the phrases 2 cents, 4 cents, 6 cents, &c., which are exposed through the slot $b$ in routine, and indicate the postage necessary to be applied to a letter or first class mail matter. In the space $c'$ is the phrase, 1 cent, repeated four times, so that one cent postage will be indicated in the slot $c$ for any weight up to four ounces; on the fifth line of the space the phrase 2 cents begins, and is repeated in a like manner, and on the ninth line the phrase 3 cents begins and is repeated four times, so that for any portion of the first four ounces one cent will be indicated in the slot $c$ and for any portion of the second four ounces 2 cents will be indicated, and for any portion of the third four ounces 3 cents will be indicated, &c. In the fourth space $d'$ are the phrases 1 cent, 1 cent, 2 cents, 2 cents, &c., each repeated twice, so that one cent postage will be indicated in the slot $d$ during the first two ounces and two cents during the second two ounces, &c., all the way down the column. In the space $e'$ are the phrases 1 cent, 2 cents, 3 cents, &c., so that one cent postage will be indicated in the slot $e$ for each ounce of weight. In the space $f'$ are intermediate transverse lines, or what what may be termed half ounce spaces, between which are the phrases 5 cents, 10 cents, 15 cents, &c., so that five cents will be indicated in the slot $f$ for each one half ounce, which is the foreign postage.

As shown in Fig. 1, in the space above the slot $a$ is written the statement "Weight in ounces," which means that the weight in ounces will be indicated in the slot $a$. In the space above the slot $b$ is written "1st. Class" "Letters and all written matter," to indicate that the postage necessary for such matter will be shown in the slot $b$ below, and the written matter in each of the spaces above the slots $c$, $d$, $e$ and $f$ describes in like manner the character of postage which is indicated in the slot below. Above the second, third and fourth class columns is printed in one space the words "Mail in package box," and over the first class and foreign mail columns is the statement "Mail in letter box," to show the proper receptacle in which to deposit the mail. Thus, if a person wishes to mail a book, it is placed on the platform "A," and should the book weigh six ounces, the weight of the book will cause the indicator "D'" to rise until the number 6 is displayed through the slot $a$, and the phrase "3 cents" is displayed in the slot $d$; the result shown on the face of the scales being that the book weighs six ounces, that it belongs to third class matter, and that it requires three cents postage and should be mailed in package box.

Having thus described my invention, what I claim as my invention is—

1. The indicator face piece D having a supporting frame provided with the counterweight T and with balance points F resting upon cleats I, said frame and face piece being adapted to be actuated by weight applied to the spindle B connected therewith, in combination with a slotted face scale box, substantially as described.

2. In a postal scale, the indicator face piece D provided with the graduated scale, suitable arms connecting it with the balance bar G, the suspended counterweight T, and rearwardly projecting arm H supporting the spindle B and platform A, in combination with the slotted face scale box, as and for the purpose specified.

In testimony that I claim the foregoing improvement in postal scales as above described I have hereunto set my hand this 14th day of July, 1893.

ISAAC S. McGIEHAN.

Witnesses:
G. H. HUNTINGTON,
R. S. SPENCER.